United States Patent [19]
Grisham et al.

[11] Patent Number: 5,491,792
[45] Date of Patent: Feb. 13, 1996

[54] SEQUENCE OF EVENTS SYSTEM USING A REDUNDANT ANALOG I/O BOARD SYSTEM

[75] Inventors: James S. Grisham, Midlothian; Billy R. Slater, Plano, both of Tex.

[73] Assignee: Forney International, Inc., Carrollton, Tex.

[21] Appl. No.: 311,115

[22] Filed: Sep. 23, 1994

[51] Int. Cl.$^6$ .................................................. G06F 11/20
[52] U.S. Cl. ................... 395/183.15; 395/182.10
[58] Field of Search ................ 371/8.2, 9.1; 395/575, 395/183.15, 182.10

[56] References Cited

U.S. PATENT DOCUMENTS

| | | |
|---|---|---|
| 4,303,973 | 12/1981 | Williamson et al. . |
| 4,304,001 | 12/1981 | Cope . |
| 4,500,951 | 2/1985 | Sugimoto et al. . |
| 4,667,323 | 5/1987 | Engdahl et al. . |
| 4,680,581 | 7/1987 | Kozlik et al. . |
| 4,775,976 | 10/1988 | Yokoyama ................................. 371/9 |
| 4,847,837 | 7/1989 | Morales et al. ............................. 371/8 |
| 4,890,222 | 12/1989 | Kirk . |
| 4,939,753 | 7/1990 | Olson . |
| 5,008,805 | 4/1991 | Fiebig et al. ............................ 364/184 |
| 5,012,468 | 4/1991 | Siegel et al. . |
| 5,016,244 | 5/1991 | Massey et al. . |
| 5,185,708 | 2/1993 | Hall et al. . |
| 5,225,975 | 7/1993 | Gates et al. . |
| 5,251,302 | 10/1993 | Weigl et al. . |
| 5,253,252 | 10/1993 | Tobol . |
| 5,268,907 | 12/1993 | Suzuki et al. ........................... 371/8.2 |
| 5,270,917 | 12/1993 | Kimura ................................... 364/187 |
| 5,272,702 | 12/1993 | Snowbarger et al. . |
| 5,289,469 | 2/1994 | Tanaka . |
| 5,319,574 | 6/1994 | Ikeda . |

*Primary Examiner*—Robert W. Beausoliel, Jr.
*Assistant Examiner*—Alan M. Fisch
*Attorney, Agent, or Firm*—Lane, Aitken & McCann

[57] ABSTRACT

In a sequence-of-events system for a distributed process control system, unfiltered changes in process element status are initially stored at each remote site along with a time tag. Each remote site has an I/O manager board to which are connected a number of individual I/O boards. Each I/O board in turn has connected to it process signal inputs from a number of process elements (e.g., 16), which can be in an "on" or "off" state. Each I/O board includes a change-of-state detector to which the process signal inputs are coupled. The change-of-state detector detects a change of state of any process input and generates an interrupt signal, which is coupled to a microprocessor also located on the I/O board. The microprocessor reads the status of all the process element inputs coupled to the scanner and also the output of a local clock on the I/O board. The microprocessor records in a sequence-of-events memory on the I/O manager board the status of all process signal inputs to the change-of-state detector at the time of a change in any input, along with the relative time at which the change occurred.

11 Claims, 6 Drawing Sheets

SEQUENCE OF EVENTS SYSTEM USING A REDUNDANT ANALOG I/O BOARD SYSTEM

BACKGROUND OF THE INVENTION

1. Field of the Invention

This invention relates to an improved method and apparatus for generating sequence-of-events data in a distributed process control system, and more particularly, to generating unfiltered sequence-of-events data that records as an event very rapid changes in a process signal input.

2. Description of the Prior Art

A distributed process control system of the type generally contemplated by this invention is disclosed in U.S. Pat. No. 4,304,001 to Cope assigned to the assignee of this invention and incorporated herein by reference. The patented Cope system has a number of remotely located process control units, each coupled through an associated input/output device to a communications link, which interconnects all the remote units. Each process signal input lead, which provides an "on" or "off" status of a process element, is terminated at a printed circuit card and each printed circuit card has, for example, a capacity to receive 16 process signal inputs. Each remote unit typically has a number of these process input printed circuit cards.

As will be appreciated by those skilled in the art, in a process control system it is highly desirable to be able to construct a sequence-of-events record in order to determine, in a time ordered sequence, the state of some or all of the process elements within a window of time. This sequence-of-events record allows an analysis of the process operation; for example, an analysis to determine the cause of a process upset.

To generate a sequence-of-events record, each change of status of a process element is noted, tagged with a time-of-day indication, and the status and its time tag stored at least for a short period. In order to provide a highly accurate sequence-of-events record, it is desirable to time tag and store changes in a process element status that occur in close time sequence, i.e., within 0.1 millisecond. In a distributed process control system, it is difficult to maintain close clock synchronization throughout the distributed network, and to gather and store a large amount of sequence-of-event data without overburdening the communications network linking the remote units or the I/O channel linking the inputs from the process elements to the network.

SUMMARY OF THE INVENTION

An object of this invention is the provision of a system for generating a sequence-of-events system in a distributed process control system that records high frequency changes in process element status with a time reference that is maintained in synchronism throughout the system.

A further object of the invention is the provision of a high speed sequence-of-events system that is compatible with the master-for-a-moment control of the communications link as set forth in the aforementioned U.S. Pat. No. 4,304,001 to Cope ('001 Cope).

Briefly, this invention contemplates the provision of a sequence-of-events system for a distributed process control system in which unfiltered changes in process element status are initially stored at each remote site along with a time tag. Each remote site has an I/O manager board to which are connected a number of individual I/O boards. Each I/O board in turn has connected to it process signal inputs from a number of process elements (e.g., 16), which can be in an "on" or "off" state. Each I/O board includes a change-of-state detector to which the process signal inputs are coupled. The change-of-state detector detects a change of state of any process input and generates an interrupt signal, which is coupled to a microprocessor also located on the I/O board. The microprocessor reads the status of all the process element inputs coupled to the scanner and also the output of a local clock on the I/O board. The microprocessor records in a sequence-of-events memory on the I/O manager board the status of all process signal inputs to the change-of-state detector at the time of a change in any input, along with the relative time at which the change occurred.

All I/O boards at a remote are coupled to the communications link interconnecting all remotes through an I/O manager. The I/O manager includes a clock, which is used to synchronize all the I/O board clocks at that remote, and is itself synchronized over the communication link with the I/O manager clocks at the other remotes on the network. The I/O manager clock at one of the remote units is designated as a master clock remote and all of the remote units are synchronized to this master remote clock. In a preferred embodiment of the invention, an ethernet network protocol is employed, and a time reference message is inserted in an unused portion of the header in the pass control message issued by the master clock remote each time the master clock remote passes communications link control to the next remote.

A sequence-of-events logger is connected to the communications link, preferably through one of remote communications controllers. The logger is responsible for gathering, saving, and analyzing the sequence-of-events data collected throughout the system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
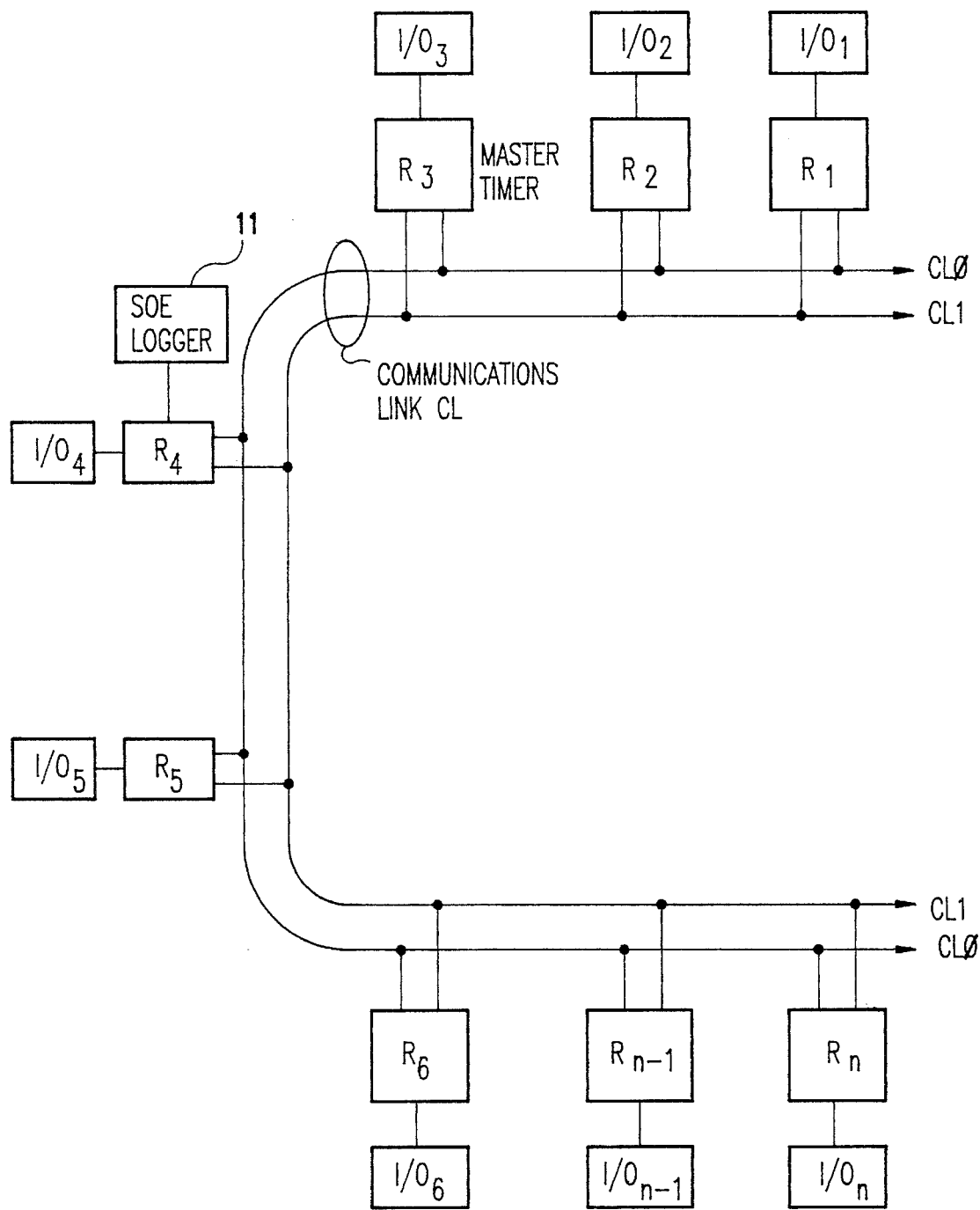
FIG. 1 is a schematic diagram of an exemplary process control system including a plurality of remote process control units (remotes) connected to a common, dual-channel communications link.

An industrial control system in accordance with the present invention is shown in schematic form in FIG. 1 and includes a communications link CL having a plurality of remote process control units (remotes) $R_1, R_2, \ldots R_{n-1}, R_n$ connected thereto. One of the remotes ($R_3$) is designated as master time remote. It inserts a message on the communications link CL signifying the time indicated by its I/O manager clock. Each remote receives this message and synchronizes its own I/O manager clock to this message. In the preferred embodiment of the invention, an ethernet protocol network is used in combination with the master-for-a-moment protocol of the '001 Cope patent. A time message is inserted in an unused portion of the ethernet header of the pass control message each time the master clock remote (e.g., $R_3$), having been master for a moment, passes control of the network to the next remote. It will be appreciated that selection of a particular remote as the master clock may be made arbitrarily and one of the other remotes can serve as master clock in the event of a failure of the selected remote. A personal computer 11 is coupled to one of the remotes ($R_4$) and serves as a sequence-of-events logger.

The communications link CL is shown as an open line, double channel configuration formed from dual coax, dual twisted pair, or the like with the individual communications links identified, respectively, by the reference characters CL$\phi$ and CL1. The system of FIG. 1 is adapted for use in controlling an industrial process, e.g., the operation of a power generating plant, with each remote unit $R_n$ including one or more associated input/output manager devices I/O$_1$, I$_{O2}$, ... I/O$_{n-1}$, I/O$_n$ to which are connected field inputs from various types of sensors (temperature, pressure, position, and motion sensors, etc.) and various types of controlled devices (motors, pumps, compressors, valves, solenoids, and relays, etc.).

Figure 2:
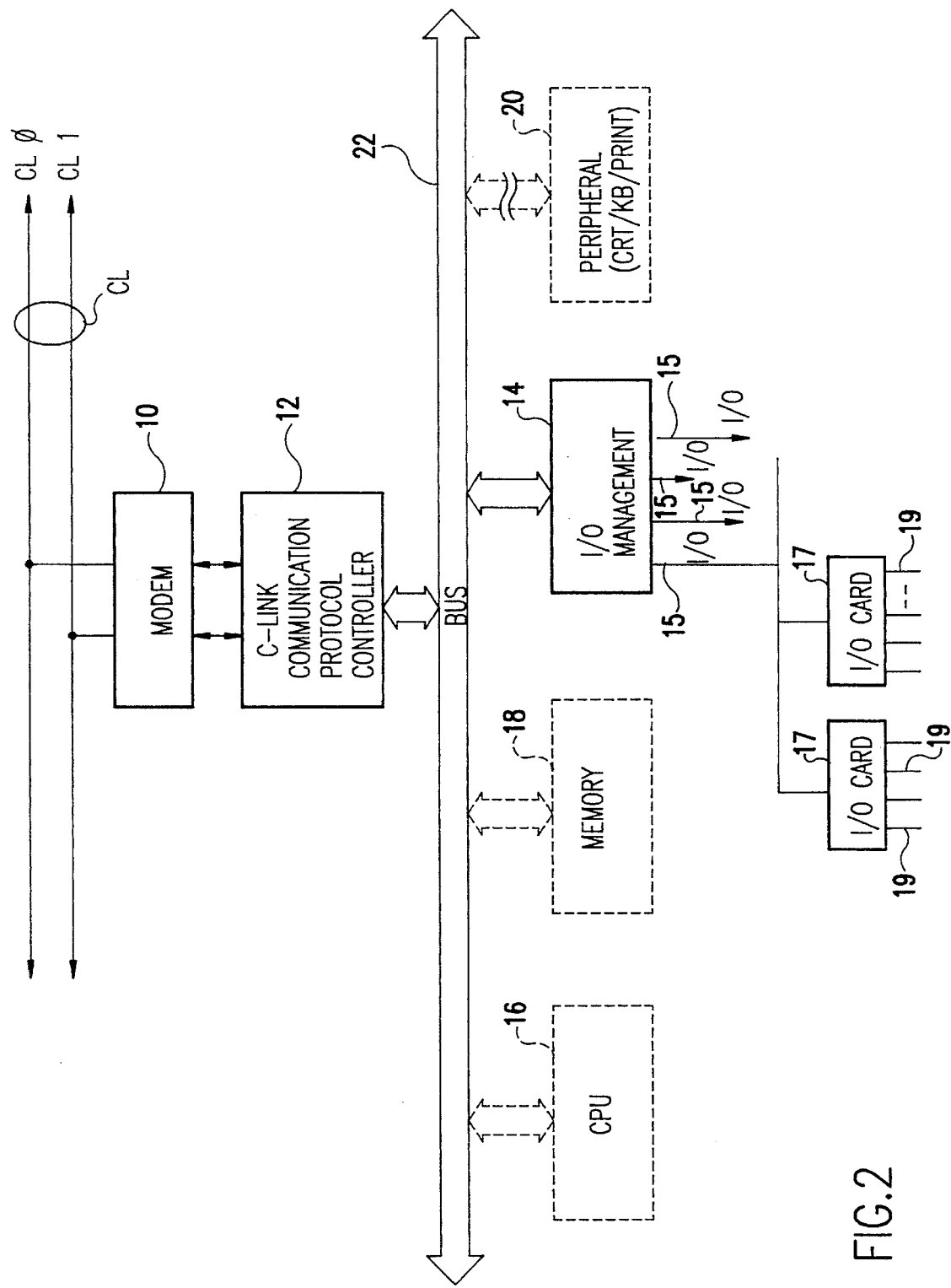
FIG. 2 is a schematic block diagram of an exemplary remote process control unit of the type shown in FIGS. 1.

The architecture of an exemplary remote $R_n$ is shown in FIG. 2. While the architecture of the remote $R_n$ can vary depending upon the control process requirements, the remote shown in FIG. 2 includes a modem 10; a communications protocol controller 12; an input/output (I/O) management board 14; a central processing unit (CPU) 16; a memory 18; a peripheral device 20 that can include e.g., a CRT display, a printer, or a keyboard; and a common bus 22 which provides addressing, control, and information transfer between the various devices which constitute the remote. The devices shown in dotted line illustration in FIG. 2 (that is, the central processing unit 16, the memory 18, and the peripheral device 20) may or may not be provided depending upon the process control requirements for the remote $R_n$.

Each I/O management board 14 in a preferred embodiment can support up to eight serial communications links 15. Up to thirty-two I/O boards 17 are connected to each serial link 15 and sixteen process signal inputs 19 are connected to each I/O board 17.

Figure 3:
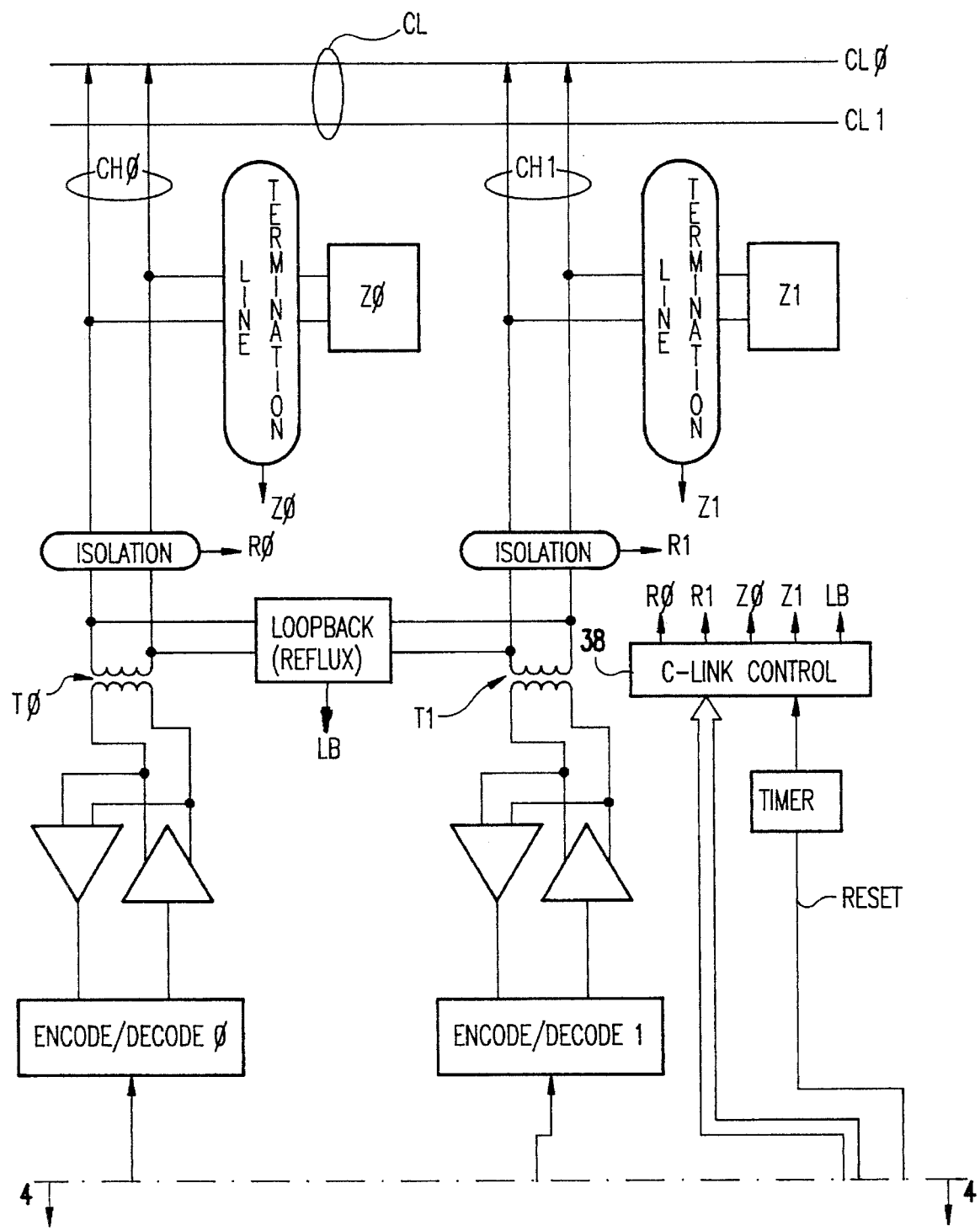
FIG. 3 is a schematic block diagram of an exemplary modulator/demodulator for the remote process control unit Shown in FIG. 2.

As shown in more detail in FIG. 3, the modem 10 provides two independent communications channels CH$\phi$ and CH1 connected respectively to the communications link CL$\phi$ and CL1. These communication channels, which are substantially identical, are well known in the art, are described in detail in the '001 Cope patent and need not be repeated here.

Figure 4:
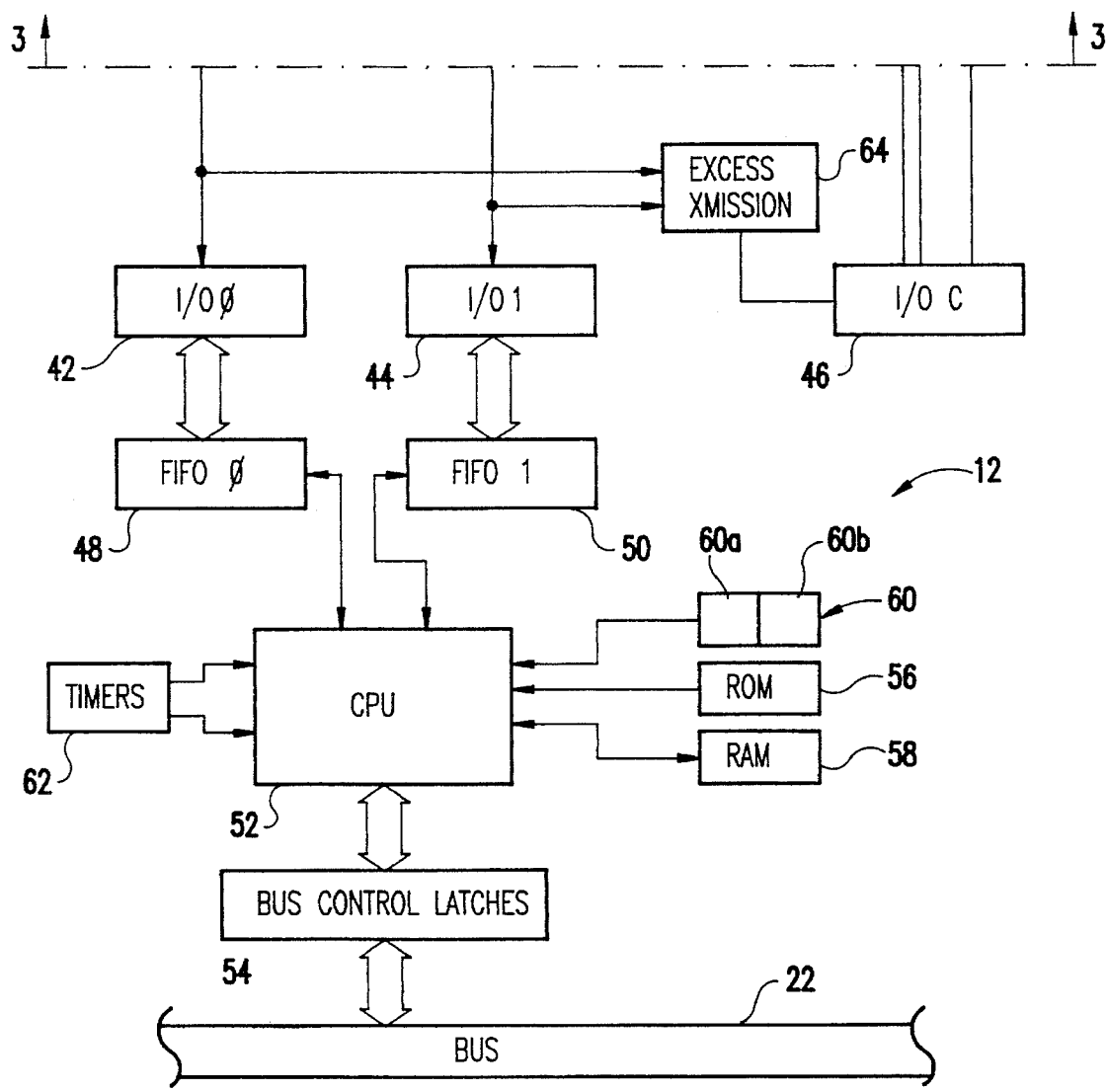
FIG. 4 is a schematic block diagram of an exemplary communication protocol controller for the remote process unit shown in FIG. 2.

As is shown in FIG. 4, each communication protocol controller 12 includes input/output ports 42, 44, and 46 which interface with the above-described modem 10 for the communication channels CH$\phi$ and CH1 and the modem C-link control device 38 (FIG. 3). A first-in first-out (FIFO) serializer 48 and another first-in first-out serializer 50 are connected between the input/output ports 42 and 44 and a CPU signal processor 52. The first-in first-out serializers 48 and 50 function as temporary stores for storing information blocks provided to and from the modems 10. The CPU 52, in turn, interfaces with the bus 22 through bus control latches 54. A read only memory (ROM) 56 containing a resident firmware program for the CPU and a random access memory (RAM) 58 are provided to permit the CPU to effect its communication protocol function. A register 60 (for example, a manually operable DIP switch register or a hardwired jumper-type register) that includes registers 60a and 60b and timers 62 are also provided to assist the CPU in performing its communication protocol operation.

An excess transmission detector 64, connected to input/output ports 42 and 44 (corresponding to communication channels CH$\phi$ and CH1) determines when the transmission period is in excess of a predetermined limit to cause the C-link control device 38 (FIG. 3) to disconnect the transmitting remote from the communications link CL and thereby prevent a remote that is trapped in a transmission mode from monopolizing the communications link CL.

Figure 5:
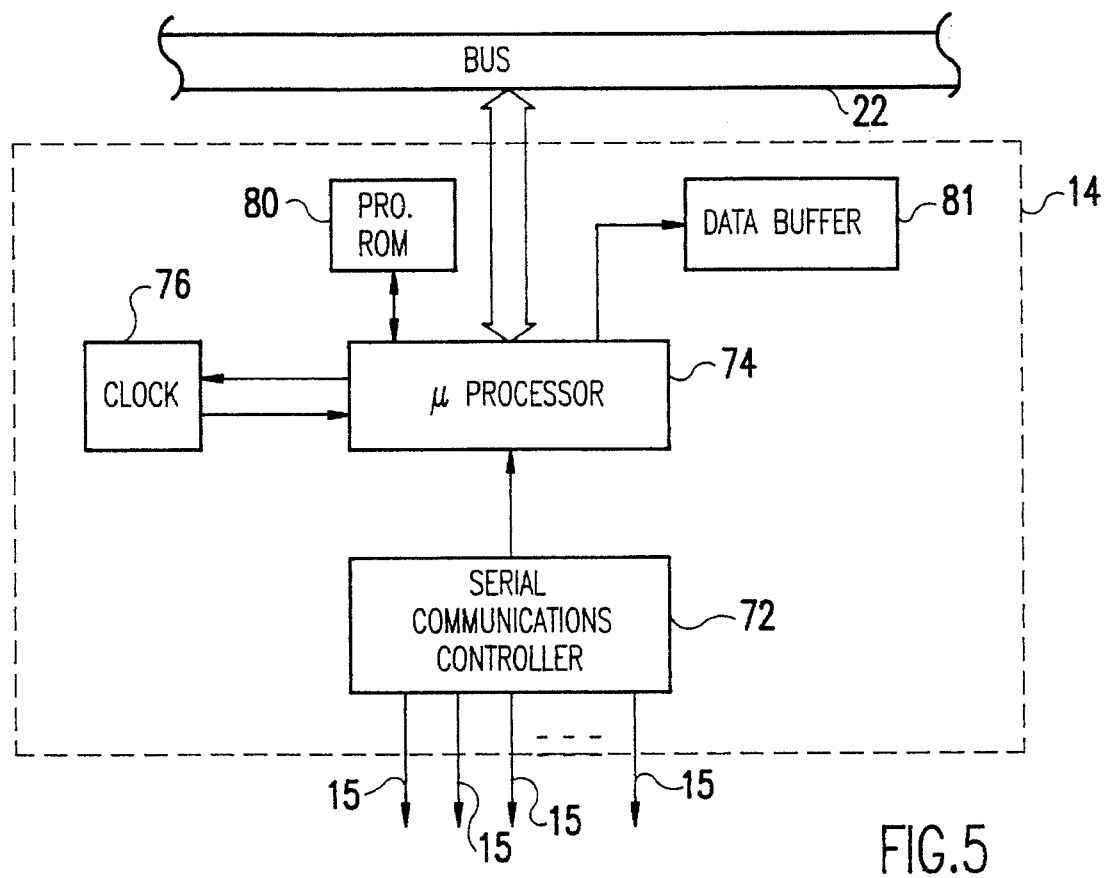
FIG. 5 is a block diagram of an input/output management unit in accordance with the teachings of this invention.

Referring now to FIG. 5, each I/O manager 14 includes a microprocessor 74, a serial communications controller 72, to which the serial links 15 are connected, a clock 76, a program ROM 80 and a data buffer 81. The time clock 76 is connected to the processor 74. Typically, the time clock 76 includes a stable, high-frequency oscillator and a register which accumulates the output of the oscillator in, for example, milliseconds, seconds, and hours up to twenty-four hours. Upon each receipt of a master time message over communications link CL, the processor 74 compares the received time message and the time in the register. If there is a difference, it sets the register value to correspond to the received message.

Figure 6:
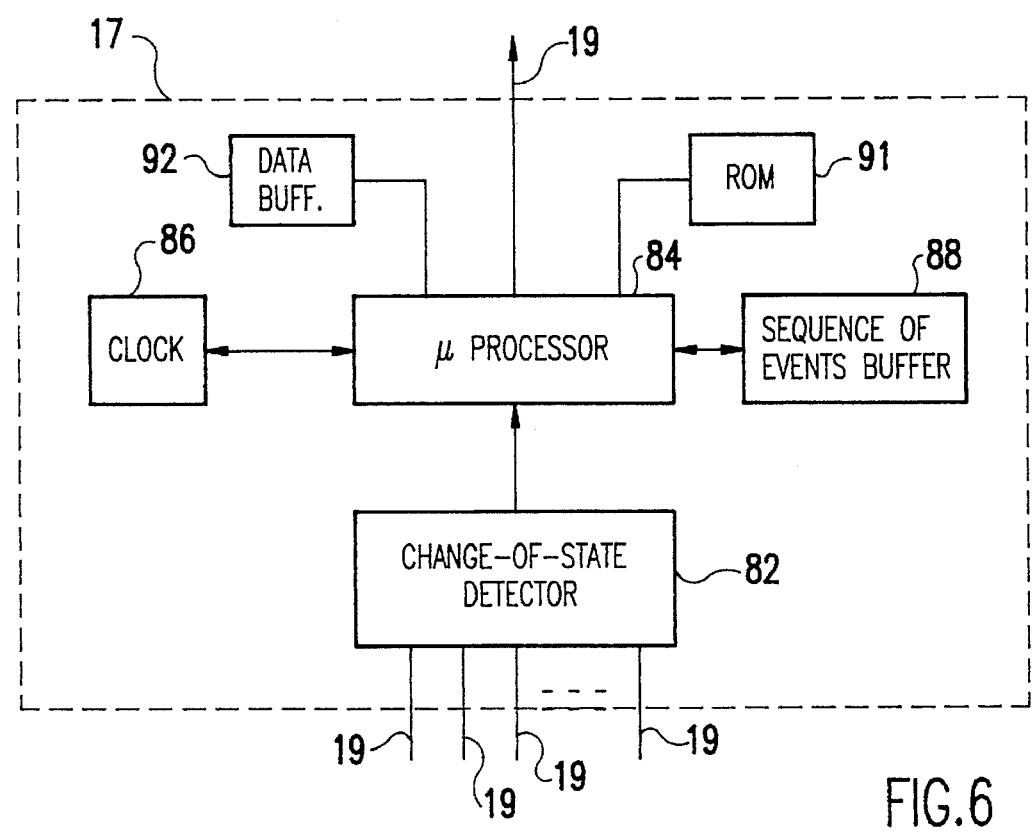
FIG. 6 is a block diagram of an I/O board in accordance with the teachings of this invention.

Referring now to FIG. 6, each I/O board 12 has a number (e.g., 16) of process signal inputs 19 connected to a change-of-state detector 82, which detects a change of state of each of process signal input leads 19. In a preferred embodiment of the invention, state changes on any lead 19 separated in time by 0.1 millisecond are detected, and the status of all inputs at the time of change is recorded. The output of the change-of-state detector 82, is coupled as an input to a microprocessor 84. A clock 86, similar to clock 76, and a sequence-of-events buffer 88 are also coupled to the microprocessor 84. A program ROM 91 stores the program to control the operation of processor 84.

As will be appreciated by those skilled in the art, responding to changes in the status of the process inputs leads 19 separated in time by as little as 0.1 milliseconds (i.e., an input bandwidth extending up to 10 KHertz) is responsive to noise on the process signal input leads caused, for example, by bounce of the process contact in opening or closing. While it is desirable to record with such resolution for the purpose of constructing a sequence-of-events record, the status of the process input signal leads for process control purposes should be recorded free of such noise; i.e., recorded when the process signal input settles to a steady state. The raw inputs from change-of-state detector 82 are filtered by microprocessor 84 and the filtered status (i.e., steady state status) is stored in a buffer 92. Data stored ill buffer 92 is coupled via I/O manager 14 and the communications link processor 52 to the link CL as part of the process control operation, as described in the '001 Cope patent.

The change-of-state scanner 82 monitors the sequence of events on inputs 19 and detects when any one of them changes state. The definition of a change of state, in accordance with one specific embodiment of the invention, is, for example, a change from the off to the on or the on to the off state of any input that lasts longer than 0.1 millisecond. The sequence-of-events buffer 88 is a wraparound buffer that is capable of holding the record of a predetermined number of events, 3,000 events for example. After the predetermined number of events has been recorded, the next event will overwrite the oldest previous event. Each event record contains a time tag (e.g., a 4-bite tag to a 0.1 millisecond resolution) and a complete input status image for all of the inputs 19 (e.g., 16) at the time of the state change.

Figure 6A:
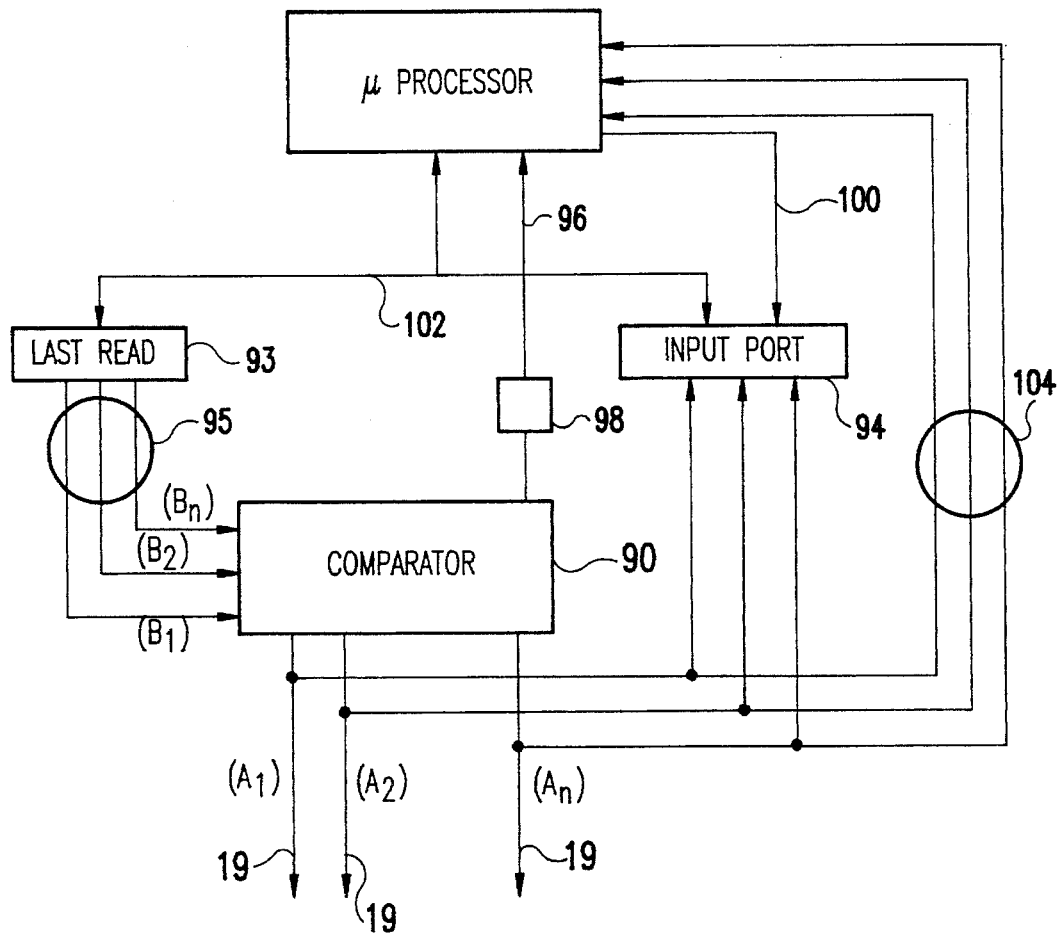
FIG. 6A is a schematic diagram of an exemplary embodiment of a change-of-state detector of FIG. 6.
Figure 7:
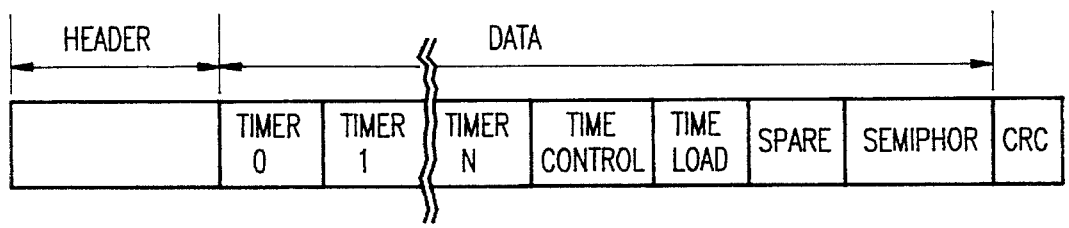
FIG. 7 is a diagram illustrating the format of a pass control message issued by the master timer remote.

Any suitable logic may be used to implement change-of-state detector 82. For example, as shown in FIG. 6A, the inputs 19 are connected to a comparator 90 whose other inputs 95 are the outputs of a last read register 93. Comparator 90 compares the status of inputs 19 and 95 on a one-to-one basis (i.e., $A_1$ to $B_1$; $A_2$ to $B_2$ and $A_N$ to $B_N$). The inputs 19 are also coupled to an input port 94 of the microprocessor 84.

A lead 96 couples an output signal from comparator 90 to microprocessor 84 as an interrupt each time comparator 90 detects a change of state of any input 19 as compared with its last read value in register 93. Delay element 98 establishes a 0.1 millisecond delay in the output of comparator 90 so that only changes in status that persist for more than 0.1 millisecond are recorded. In response to an interrupt input signal on lead 96, microprocessor 84 issues a read command on line 100 to read the status of the inputs to port 94. The status of all inputs 19 are read via bus 102 and stored in sequence-of-events memory 88, as previously explained. At the same time, the bus 102 updates the last read register 93 to the new status.

Leads 104 couple the status inputs 19 to another input port of the microprocessor 84 for "normal" process operation. The processor scans each of these inputs and reports each change of status of an input for process control purposes. The processor 84 performs a software implemented filter function with respect to status of inputs 19 for reporting their status for control purposes. For example, processor 84 scans the status of each input once each millisecond and keeps count of the status as "on" or "off." At the end of a predetermined number of scans, it reports the status as "on" or "off" depending on the number of "on" counts relative to the number of "off" counts and the previous status of the input. For example, if in the 50 scan window the status is "on" for 40 scans, "off" for 10 scans, and previously "on," the processor will report the status of that particular input 19 as off. The relative number of scans in which the input status obtains to the total number during a scanning window in order to record a change can be adjusted to obtain a desired filtering effect.

There are two additional types of entries in the sequence-of-events buffer 88. The first additional type entry is an entry that occurs at midnight to mark the events buffer with a day rollover. This entry is used to distinguish between similar stored events that occurred on different days, since the time tag stored at each event does not contain a date code. The second type of entry indicates when the time indicated by a clock 76 for a particular I/O manager 14 differs from the time clock 86 on an I/O card 17 by more than one millisecond at the time they were synchronized. This entry can be used to attempt to correct stored time tags and to indicate possible resolution errors during a sequence-of-events analysis.

As explained in more detail in the aforementioned '001 Cope patent, in the preferred master-for-a-moment embodiment of this invention, remote units communicate with one another by having each remote successively take control of the communications link CL and then passing it on by means of a pass control message that is read by all remotes on the link CL. In accordance with the preferred embodiment of this invention, communications on link CL are in the format specified for "ethernet" (i.e., a 10-megabit baseband local area network that allows multiple stations to access the transmission medium at will without prior coordination, avoids contention by using carrier sense and deference, and resolves contention by using collision detection and transmission).

As will be appreciated by those skilled in the art, and as illustrated in FIG. 6, the ethernet format includes a header and data frames as illustrated. The master-for-a-moment pass control message leaves sufficient character spaces in the data section that the master timer remote can insert a time message in the pass control message each time the master timer remote is the controlling source remote and is transferring link control to the next successive remote. This control message is read by not only the next successive remote but all the remotes on the communications link and the time synchronization message is communicated to all remotes and decoded by them, without any increase in network traffic.

At each remote, the I/O manager microprocessor 74 decodes the time from the link CL and compares it to the time input from its time clock 76. If there is a discrepancy between the time input from clock 76 and the time message received and decoded from the communications link CL, the microprocessor 74 sets the time of clock 76 to the time indicated in the received message. In this way, a time clock at each remote is maintained in synchronism with a time clock at each other remote without any increase in the message traffic in the link CL.

The time indicated by an I/O manager 14's clock 76 is used as a reference to synchronize each time clock 86.

Communications between the processor 74 and the processor 84 utilize standard transaction protocols of the '001 Cope patent for reporting normal input statuses that are used to maintain an image of the input value. In addition, two other transaction protocols are utilized. The first transaction protocol allows the processor 74 to synchronize periodically each of the clocks 86 to which it is connected via communications controller 72. The processor 74 can be programmed to send a time synchronizing message on a periodic basis based upon the specification of the clocks 86. Depending upon the sequence-of-events accuracy desired for the system, a synchronization message can be scheduled sufficiently frequently to ensure that no two time clocks 86 drift further apart than the desired accuracy.

The other transaction protocol allows the I/O manager processor 74 to send special request messages to the processor 84. The processor 84 will process the special request and, if required, send a message back to the processor 74. The processor 74 at each remote acts as an interface between the sequence-of-events logger and the sequence of events stored in buffer 88 at each input manager.

The collection of the sequence-of-events data, when requested, is controlled by a series of programmable parameters. These parameters are a list of sequence-of-events inputs from which to collect the data, a prerequest time period of events to be collected, and postrequest time period of events to be collected. When requested, all events from each listed input that occurred over the program time period before and after the request will be gathered and stored to a raw data file on a disk at the events logger. The gathering of data is accomplished by creating a request message for each I/O manager 14 containing one or more of the listed inputs. These messages contain a mask specifying which of the possible inputs is being logged. The message also contains a beginning event time and a time span. Each I/O manager 14 addressed, searches its sequence-of-events buffers 88 for entries containing a state of change for any of its requested inputs. The search looks for any entries for those inputs that occurred before the specified beginning event time and will find any such entries that exist over the specified time span. All entries found are included in a response message sent by a processor 84 via the processor 74 back to the events logger.

The raw data collected contains relative time tags that represent the time of occurrence of each event relative to the other events. The real time clock of tile events logger is used to create a real time and date tag for the collected events and is used in conjunction with the time tags (i.e., submillisecond) of each event to create the time and date associated with each event to, for example, a one millisecond resolution. A post-process corrected sequence of events can be created based on a series of programmable parameters. These may include a debounce time and field device response time for each input in the sequence-of-events list.

While the invention has been described in terms of a single preferred embodiment, those skilled in the art will recognize that the invention can be practiced with modification within the spirit and scope of the appended claims.

The invention claimed is:

1. A system for recording sequence-of-events data in a process control system comprising in combination:
   a processor, a change-of-status detector, a clock, and a sequence-of-events buffer;
   means for coupling a plurality of process signal inputs to said change-of-status detector;
   said change-of-status detector including means to generate an input to said processor in response to a change in status of any of said process signal inputs;
   said change-of-status detector responding to high frequency, unfiltered changes in status in said any of said process signal inputs to generate said input to said processor;
   said processor reading a status of each of said process signal inputs coupled to said change-of-status detector in response to said input to said processor and storing said status of each of said process signal inputs in said sequence-of-events buffer with a time-of-event tag from said clock.

2. A system for recording sequence-of-events data in a process control system as in claim 1 wherein said processor filters out said high frequency, unfiltered changes in status in a process signal input and generates process data output indicating a steady state change in said process signal.

3. A system for recording sequence-of-events data in a process control system in which a plurality of remote units are interconnected by a communications link comprising in combination:
   a remote master time unit for periodically coupling a time message to said communications link;
   each of said remote units including:
      an input/output manager and at least one input/output card coupled to said input/output manager;
      said input/output manager including a first processor coupled to said communications link and a first time clock coupled to said first processor;
      said first processor decoding said time message from said communications link and synchronizing said first time clock to said time message;
      said input/output manager including a second processor, a change-of-status detector, a second time clock, and a sequence-of-events buffer;
      means for coupling a plurality of process signal inputs to said change-of-status detector;
      means coupling said change-of-status detector to said second processor;
      said second processor storing each change of status of said processor signal inputs in said sequence-of-events buffer along with a time tag from said second time clock; and
      said second processor periodically synchronizing said second time clock with said first time clock.

4. A system for recording sequence-of-events data in a process control system as in claim 3 wherein each of said remote units periodically controls said communications link, a remote unit in control of said communications link passes control to another remote unit by means of a pass control message, which is decoded by all remote units, and said time message is encoded in said pass control message.

5. A system for recording sequence-of-events data in a process control system as in claim 4 wherein said communications link follows a protocol conforming to an Ethernet standard.

6. A system for recording sequence-of-events data in a process control system as in claim 3 wherein said change-of-status detector includes means to generate an interrupt input to said processor in response to a change in status of said process signal inputs and said second processor reads a status of each of said process signal inputs coupled to said change-of-status detector in response to said interrupt input and stores said status of each of said process signal inputs in said sequence-of-events buffer with a time tag from said second time clock.

7. A system for recording sequence-of-events data in a process control system as in claim 6 wherein said change-of-status detector responds to high frequency changes in status of said process signal inputs occurring in a range extending to 10 KHz.

8. A system for recording sequence-of-events data in a process control system as in claim 7 wherein said processor filters out high frequency changes in status of said process signal inputs to generate process data indicating a steady state change in said process signal inputs.

9. A system for recording sequence-of-events data in a process control system as in claim 6 wherein each of said remote units periodically controls said communications link, a remote unit in control of said communications link passes control to another remote unit by a pass control message, which is decoded by all remote units, and said time message is encoded in said pass control message.

10. A system for recording sequence-of-events data in a process control system as in claim 9 wherein said change-of-status detector responds to high frequency changes in status of said process signal inputs occurring in a range extending to 10 KHz.

11. A system for recording sequence-of-events data in a process control system as in claim 10 wherein said processor filters out high frequency changes in status of said process signal inputs to generate process data indicating a steady state change in said process signal inputs.

* * * * *

UNITED STATES PATENT AND TRADEMARK OFFICE
CERTIFICATE OF CORRECTION

PATENT NO. : 5,491,792
DATED : February 13, 1996
INVENTOR(S) : James S. Grisham et al.

It is certified that error appears in the above-indentified patent and that said Letters Patent is hereby corrected as shown below:

On the title page,
IN THE TITLE:

Change the title of the invention to read
--SEQUENCE OF EVENTS RECORDING FOR DISTRIBUTED PROCESS CONTROL SYSTEMS--

Column 7, line 15, "tile" should be --the--.

Signed and Sealed this

Seventeenth Day of September, 1996

Attest:

BRUCE LEHMAN

Attesting Officer          Commissioner of Patents and Trademarks